United States Patent Office 3,493,607
Patented Feb. 3, 1970

3,493,607
3-(N-ALKYLAMIDINOOXY)-1-ALKANE SULFONIC ACID INNER SALTS
Thomas F. Rutledge, Wilmington, Del., assignor to Atlas Chemical Industries, Inc., Wilmington, Del., a corporation of Delaware
No Drawing. Filed Sept. 1, 1966, Ser. No. 576,694
Int. Cl. C07c *143/14*
U.S. Cl. 260—513
5 Claims

ABSTRACT OF THE DISCLOSURE 3-(N-alkylamidinooxy)-1-alkane sulfonic acid inner salts characterized by the formula:

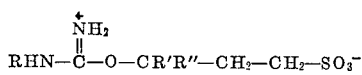

wherein R is an alkyl group containing from 8 to 18 carbon atoms and R′ and R″ are independently selected from the group consisting of hydrogen and methyl. High yields of the salts are prepared by reacting an N-alkyl urea with an alkane sultone in the presence of a Lewis acid catalyst. The salts are useful as degradeable detergents.

---

This invention relates to novel organic compounds of sulfur and nitrogen and to processes for preparing same. More particularly, this invention relates to 3-(N-alkyl-amidinooxy)-1-alkane sulfonic acid inner salts and the preparation thereof from ureas and sultones.

According to this invention there are provided new and valuable 3-N-alkylamidinooxy)-1-alkane sulfonic acid inner salts of the formula

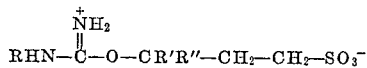

in which R is an alkyl group containing from 8 to 18 carbon atoms and R′ and R″ are independently selected from the group consisting of hydrogen and methyl. Compounds having the above general formula are zwitterion type salts which are readily obtainable by the reaction of an N-alkyl urea with an alkane sultone. The reaction may be illustrated by the following equation:

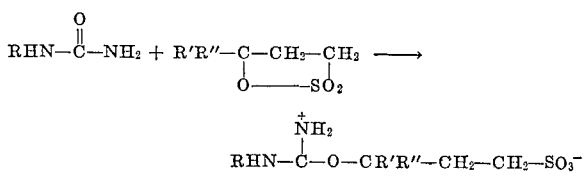

in which R, R′ and R″ are as defined hereinabove.

The sultones employed in the preparation of the present 3-(N-alkylamidinooxy)-1-alkane sulfonic acid inner salts are commercially available compounds; and may be prepared, for example, by sulfochlorination of an alkyl chloride to give a chloroalkanesulfonyl chloride, hydrolysis of the sulfonyl halide, and ring closure of the hydrolysis product with hydrogen chloride evolution to give the alkanesultone. Propane sultone, for example, may be prepared from propylchloride by the above described sulfochlorination process. Sultones which are useful in the present invention for reaction with the N-alkyl ureas to give the 3-(N-alkylamidinooxy)-1-alkane sulfonic acid inner salts are, for example, 1,3-propane sultone, 1,3-butane sultone and 3-methyl-1,3-butane sultone. Mixtures of sultones may also be used.

N-alkyl ureas which may be reacted with sultones to give the present inner salts are, for example, N-octyl urea, N-nonyl urea, N-decyl urea, N-undecyl urea, N-dodecyl urea, N-tridecyl urea, N-tetradecyl urea, N-pentadecyl urea, N-hexadecyl urea, N-heptadecyl urea and N-octadecyl urea. The alkyl group may be straight or branched. Mixtures of N-alkyl ureas may also be used.

3-(N-alkylamidinooxy)-1-alkane sulfonic acid inner salts provided by the present invention include: 3-N-dodecylamidinooxy)-1-propane sulfonic acid inner salt, 3-(N-decylamidinooxy)-1-propane sulfonic acid inner salt, 3-(N-octylamidinooxy)-1-propane sulfonic acid inner salt, 3-methyl-3-(N-decylamidinooxy)-1-butane sulfonic acid inner salt, 3-methyl-3-(N-dodecylamidinooxy)-1-butane sulfonic acid inner salt, 3-(n-octadecylamidinooxy)-1 propane sulfonic acid inner salt, 3-(N-tetradecylamidinooxy)-1-butane sulfonic acid inner salt, 3-methyl-3-(N-hexadecylamidinooxy)-1-butane sulfonic acid inner salt, etc.

Preparation of the 3-(N-alkylamidinooxy)-1-alkane sulfonic acid inner salts of this invention may be readily effected by contacting the sultones with the N-alkyl urea at elevated temperature until formation of the present zwitterion type salt is complete. The temperature may be from about 50° C. to about 135° C. and preferably from about 100° C. to about 130° C. Although a catalyst is not essential, higher yields are obtained by carrying out the reaction in the presence of a Lewis acid catalyst. Typical examples of Lewis acids include aluminum trichloride, boron trifluoride, aluminum tribromide, silicofluorides and the like. The amount of catalyst used may vary widely and satisfactory yields have been obtained with from about 2 to about 10 mol percent catalyst based on N-alkyl urea.

It is desirable to carry out the reaction in an inert solvent which will dissolve an appreciable amount of both reactants and/or an appreciable amount of the reaction product. In the absence of a solvent, the reaction mass is extremely difficult to stir and difficult to remove from the reactor. When the reaction is conducted in an inert solvent, the reaction mixture is nearly homogeneous, easy to stir and the product is a finely divided solid which can easily be transferred and processed. Inert solvents which may be used include, for example, cyclic ethers, ketones and glycol diethers, such as dioxane, methyl isobutyl ketone, dimethyl ether of diethylene glycol and the like.

The invention is further illustrated, but not limited, by the following examples.

Example 1

75 grams of N-dodecyl urea, 48.4 grams of propane sultone and 350 ml. of dioxane were added to a round bottom flask provided with a stirrer. The stirrer was turned on and the flask flushed with nitrogen. 8 ml. of boron trifluoride etherate catalyst was added and the stirred solution heated at 100° C. for 6½ hours. The solution remained clear and the formed 3-(N-dodecylamidinooxy)-1-propane sulfonic acid inner salt did not precipitate until the solution was cooled to room temperature. The precipitate was removed by filtration, washed with acetone and dried at 60° C. The dried product weighed 58 grams.

Example 2

75 grams of N-octadecyl urea, 36.6 grams of propane sultone and 400 ml. of dioxane were added to a round bottom flask provided with a stirrer. The stirrer was turned on and the flask flushed with nitrogen. 8 ml. of boron trifluoride etherate catalyst was added and the stirred solution heated at 100° C. for 7¾ hours. On cooling the reaction mixture back to room temperature, 3-(N-octadecylamidinooxy)-1-propane sulfonic acid inner salt started to precipitate at about 46° C. The reaction mixture was allowed to stand at room temperature for several minutes to insure that all the 3-(N-octadecylamidinooxy)-1-propane sulfonic acid inner salt formed had precipitated. The precipitate was removed by filtering, washed with acetone and dried at 60° C. The dried product weighed 68.3 grams.

Example 3

24 grams of N-octyl urea and 18.3 grams of propane sultone were dissolved in 200 ml. of dioxane. 3 ml. of boron trifluoride etherate was added as catalyst and the solution heated to reflux, 100° C., for six hours. The solution remained clear, and 3-(N-octylamidinooxy)-1-propane sulfonic acid inner salt did not start to precipitate until the solution was cooled back toward room temperature. After standing at room temperature for several minutes, the precipitate was removed by filtering, washed with acetone, and dried at 60° C. The dried product weighed 5.8 grams.

Example 4

A mixture of 3-methyl-3-(N-decylamidinooxy)-1-butane sulfonic acid inner salt and 3-methyl-3-(N-dodecylamidinooxy)-1-butane sulfonic acid inner salt is prepared by adding 100 grams of N-decyl urea, 114 grams of N-dodecyl urea, 150 grams of 3-methyl-1,3-butane sultone, 500 ml. of methyl isobutyl ketone and 5 grams of aluminum trichloride to a stirred flask and heating at 120° C. for three hours. The reaction mixture is then cooled to room temperature and the precipitated mixture of 3 - methyl-3-(N-alkylamidinooxy)-1-butane sulfonic acid inner salts removed by filtering.

The 3-(N-alkylamidinooxy)-1-alkane sulfonic acid inner salts of the present invention are stable white solids and are insoluble in water. Attempts to prepare the sodium salt by contacting with aqueous sodium hydroxide were unsuccessful since the sulfonates were rapidly hydrolyzed. However, it was unexpectedly discovered that the 3-(N-alkylamidinooxy)-1-alkane sulfonic acid inner salts of this invention, when compounded with alkaline builders in a built formulation, are excellent detergents and are readily degradeable. Detergency is lost quickly in waste water by hydrolysis, and the urea fragment is then easily consumed by the normal biodegradation process. The hydrolysis is believed to involve neutralization of the zwitterion by inorganic base and water to yield fatty ureas and hydroxysulfonic acids.

The detergent properties of the 3-(N-alkylamidinooxy)-1-alkane sulfonic acid inner salts of this invention are illustrated as follows: 2.8 grams of 3-(N-dodecylamidinooxy)-1-propane sulfonic acid inner salt, 7 grams of sodium tripolyphosphate, 2 grams of sodium metasilicate, 8 grams of sodium carbonate, and 0.2 gram of sodium carboxymethyl cellulose were blended to a fine powder in a Waring Blendor. The detergency of this blend was tested in water of 200 and 300 parts per million hardness (parts per million as $CaCO_3$ with 60% as Ca and 40% as Mg) in a Baker Terg-O-Tometer at 120° F. and 60 r.p.m. using American Conditioning House #119 soiled cloth. The concentration of the detergent composition was 0.25 weight percent. The wash cycle consisted of placing the soiled cloth (4 x 4 inches) in the preheated detergent (one liter volume), washing for 15 minutes followed by two separate three minute rinses. The cloth was then dried at 185° F. for one hour followed by conditioning for 24 hours in a constant temperature and humidity (75° F., 40% R.H.). The reflectance of the cloth was then measured. The percent increase in reflectance was calculated using the following equation:

Percent increase in reflectance =
$$\frac{\text{Washed cloth R} - \text{Original R}}{\text{Original R}} \times 100$$

when R is the reflectance of the cloth. The increase in reflectance was 91.5% in 200 p.p.m. water hardness and 82.2% in 300 p.p.m. water hardness.

The fact that the 3-(N-alkylamidinooxy)-1-alkane sulfonic acid inner salts of the present invention degrade fairly rapidly in water is illustrated as follows: A blend of 0.1 gram of 3-(N-dodecylamidinooxy)-1-propane sulfonic acid inner salt and 0.1 gram of sodium carbonate were vigorously mixed with 50 ml. of water. The amount of foam formed was 55 ml. After standing 24 hours, the mixture was vigorously shaken. The amount of foam formed was only 16 ml.

Although this invention has been described with reference to specific chemical materials, including specific N-alkyl ureas, sultones, catalysts and solvents as well as specific method steps, it will be appreciated that numerous other chemical materials may frequently be substituted for those described and that the method steps may be modified, all within the spirit and the scope of this invention as defined in the appended claims.

What is claimed as new and desired to be protected by Letters Patent of the United States is:

1. A compound of the formula:

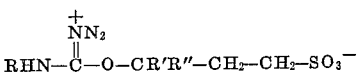

wherein R is an alkyl group containing from 8 to 18 carbon atoms and R' and R" are independently selected from the group consisting of hydrogen and methyl.

2. A compound in accordance with claim 1 wherein R' is hydrogen and R" is methyl.

3. A compound in accordance with claim 1 wherein R' and R" are both hydrogen.

4. A compound in accordance with claim 3 wherein R is an alkyl group containing 10 carbon atoms.

5. A compound in accordance with claim 3 wherein R is an alkyl group having 12 carbon atoms.

References Cited

UNITED STATES PATENTS 2,758,133   8/1956   Erickson _____ 260—513

BERNARD HELFIN, Primary Examiner

M. W. GLYNN, Assistant Examiner

U.S. Cl. X.R.

252—137

PO-1050
(5/69)

UNITED STATES PATENT OFFICE
CERTIFICATE OF CORRECTION

Patent No. 3,493,607            Dated February 3, 1970

Inventor(s) Thomas F. Rutledge

It is certified that error appears in the above-identified patent and that said Letters Patent are hereby corrected as shown below:

Column 1, lines 51-54, that portion of the formula $$\overset{+}{\underset{|}{N}H_2} \quad\quad\quad\quad\quad\quad \overset{+}{\underset{||}{N}H_2}$$
$$-C- \quad\quad \text{should read} \quad\quad -C-$$

Column 4, lines 37-40, that portion of the formula $$\overset{+}{\underset{||}{N}N_2} \quad\quad\quad\quad\quad\quad \overset{+}{\underset{||}{N}H_2}$$
$$-C- \quad\quad \text{should read} \quad\quad -C-$$

SIGNED AND
SEALED
JUL 28 1970

(SEAL)
Attest:

Edward M. Fletcher, Jr.
Attesting Officer

WILLIAM E. SCHUYLER, JR.
Commissioner of Patents